United States Patent Office 3,542,598
Patented Nov. 24, 1970

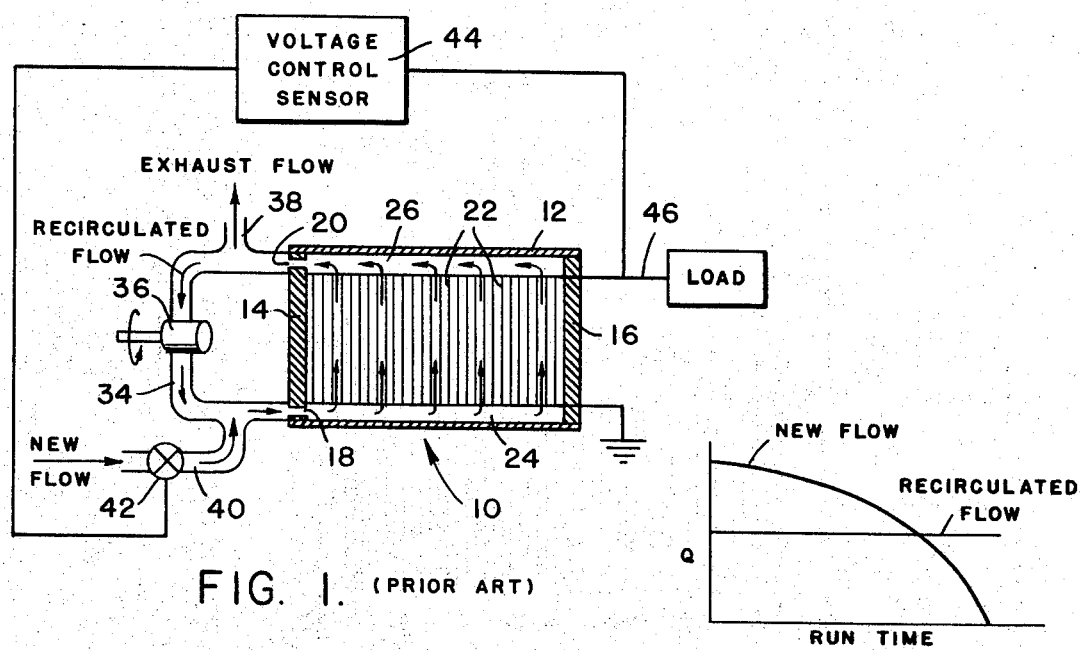
FIG. 1. (PRIOR ART)
FIG. 2. (PRIOR ART)
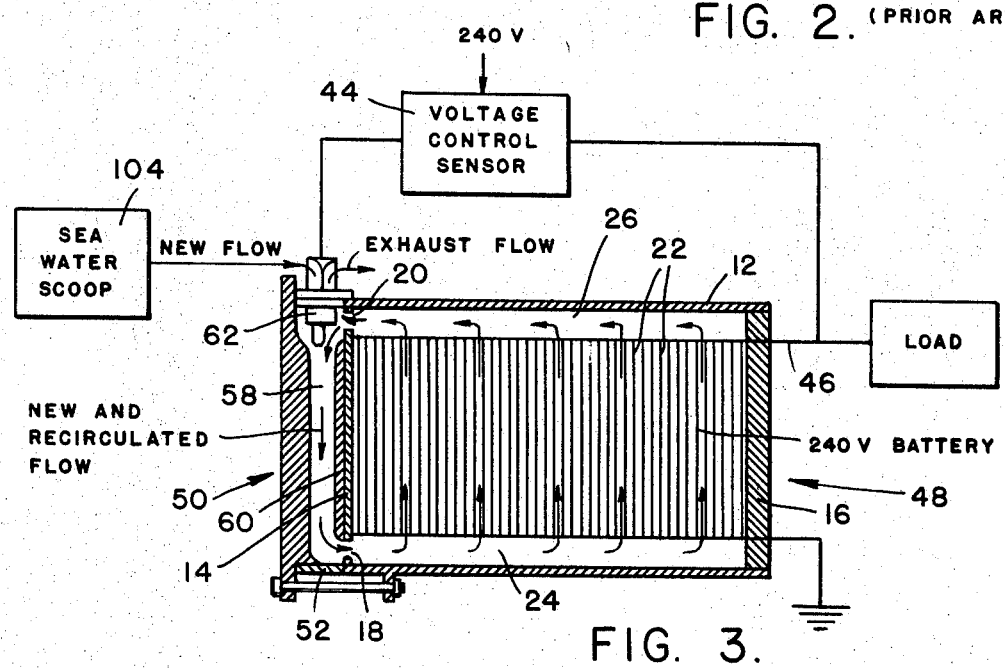
FIG. 3.
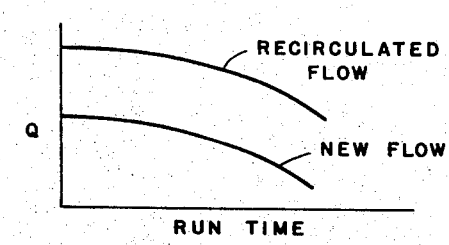
FIG. 4.
INVENTORS.
WILLIAM D. WHITE
JAMES H. GREEN
CARL D. RUNGE
BY
ERVIN F. JOHNSTON
ATTORNEY.

3,542,598
SEA WATER BATTERY EMPLOYING ELECTROLYTE RECIRCULATION CIRCUIT
William D. White, Pasadena, James H. Green, Sierra Madre, and Carl D. Runge, Pasadena, Calif., assignors to the United States of America as represented by the Secretary of the Navy
Filed Feb. 5, 1969, Ser. No. 796,670
Int. Cl. H01m *17/00, 11/00*
U.S. Cl. 136—100     7 Claims

ABSTRACT OF THE DISCLOSURE

A sea water battery, including a battery casing having inlet and outlet ports; a series of plates mounted within the casing and spaced therefrom to form inlet and outlet manifolds which communicate with the casing's inlet and outlet ports; passageway means mounted at one end of the battery casing for communicating the outlet and inlet ports; a jet nozzle having an inlet port for receiving new electrolyte flow from the ocean; the jet pump being mounted within the passageway for causing venturi action between the new flow and an old electrolyte battery outlet flow from the outlet port; electrically operated valve means for controlling new electrolyte flow to the jet nozzle; and means connected between an output lead to the battery and said valve means for closing the valve means when the battery voltage falls below a predetermined level.

---

The invention described herein may be manufactured and used by or for the Government of the United States of America for governmental purposes without the payment of any royalties thereon or therefor.

A sea water battery may be utilized for supplying power to an underwater vehicle, such as a torpedo. Such an application calls for a wet cell type of battery which will deliver high power over a relatively short period of time. A typical sea water battery includes a series of plates which are spaced from the top and bottom of a battery casing to form outlet and inlet manifolds respectively which open into respective outlet and inlet openings in the end of the battery casing.

In supplying power to an underwater vehicle it is important that the sea water battery have a substantially constant output voltage during is period of operation. By properly controlling the temperature of the electrolyte within the battery the desired voltage control can be attained. If the battery voltage should drop an increase in the temperature of the electrolyte will quickly increase the voltage and should the voltage of the battery exceed the desired level a decrease in the temperature of the electrolyte will decrease the voltage. If the original or old electrolyte in the battery is continuously recirculated without the addition of a new cooler electrolyte the battery voltage would progressively increase and exceed the desired output voltage and lead to ultimate destruction of the battery. Accordingly, it is necesary to exhaust a portion of the electrolyte exiting the battery outlet port and properly introduce a cooler new flow of electrolyte, such as ocean water, to maintain the output voltage of the battery at the desired level.

A previous method of obtaining a desired mixture of old electrolyte flow from the battery with new flow from the ocean has been to use a motor driven pump in a conduit which connects the outlet and inlet ports of the battery along with a control valve in the new flow line. The control valve opens and closes the new flow line in response to a voltage control sensor which senses whether the output voltage of the battery is exceeding or falling below the desired level. The disadvantages of this arrangement are the necessity of providing energy from either the battery or some other source to run the pump the size and weight of the pump and motor to run the pump, and the requirement of a high pressure rotating seal between the pump and the motor which becomes a problem at deep ocean depths. Another disadvantage of the aforementioned arrangement is that a desirable ratio between the old flow to be recirculated and the new flow cannot be maintained throughout the life of the battery. It is desirable to maintain a high ratio of recirculated flow to new flow so that the temperature differential across the battery plates is kept at a minimum. A minimum temperature differential between the bottom and the top of the plates will maximize even use of the battery plates.

The present invention is a sea water battery which has an electrolyte recirculation circuit which is relatively small in size and weight, requires no auxiliary energy source for operation, and which maximizes even utilization of the plates during operation of the battery. This has been accomplished by providing a passageway means mounted at one end of the battery casing for communicating the outlet and inlet ports; mounting a jet nozzle in the passageway means with an inlet port for receiving new electrolyte flow from the ocean and for causing venturi action between the new flow and a portion of the old flow; valve means for controlling the new electrolyte flow to the jet nozzle; and means connected between an output lead to the battery and the valve means for closing the valve means when the battery voltage falls below a predetermined level. With such an arrangement a pump and motor for driving the pump is no longer required for pumping the electrolyte through the battery. The jet nozzle can be easily adapted for connection to a water scoop on the vehicle so that movement of the vehicle through the water will force ocean water through the nozzle for jet action. Further, by properly locating the jet nozzle within the passageway at the end of the battery a desired high ratio of recirculated or old flow to new flow can be obtained so as to maximize even use of the battery plates.

An object of the present invention is to provide a wet cell sea water battery which has a low cost and efficient recirculation system.

Another object is to provide a wet cell sea water battery, for an underwater vehicle, which has a recirculation system which does not require a motor driven pump.

A further object of the present invention is to provide a wet cell sea water battery, for an underwater vehicle, which has a recirculation system which is adapted to receive new electrolyte flow from a water scoop on the vehicle and properly mix this new flow with old electrolyte flow from the battery to obtain a desired output from the battery.

Sill another object is to provide a wet cell sea water battery which has a recirculation system which will maximize even use of the battery plates.

Other objects and many of the attendant advantages of this invention will be readily appreciated as it becomes better understood by reference to the description and accompanying drawings which follow.

FIG. 1 is a somewhat schematic illustration of a sea water battery having a prior art recirculation system.

FIG. 2 is a graph of quantities of new electrolyte flow and recirculated or old electrolyte flow versus run time for a battery with the prior art recirculation system.

FIG. 3 illustrates a longitudinal cross-sectional view through one embodiment of our sea water battery with some of the details shown schematically.

FIG. 4 is a graph illustrating quantities of recirculated or old electrolyte flow and new electrolyte flow versus run time of our battery illustrated in FIG. 3.

Figure 7:
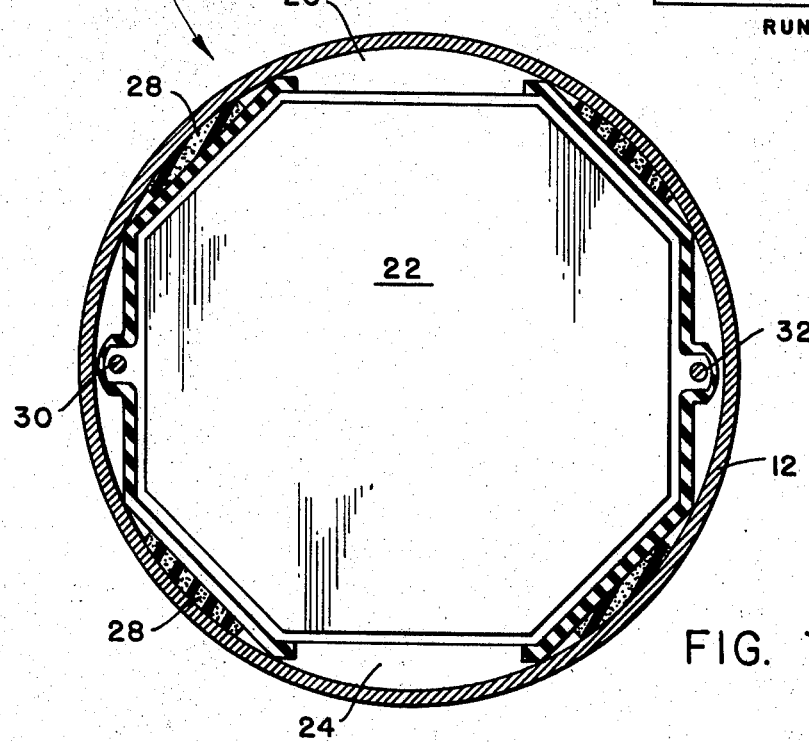
FIG. 7 illustrates a cross-sectional view through an exemplary sea water battery.

Referring now to the drawings wherein like reference numerals designate like or similar parts throughout the several views there is shown in FIG. 1 a sea water battery 10 which has a prior art recirculation system shown at the left end thereof. The sea water battery includes a battery casing 12 which has a pair of spaced apart ends 14 and 16. The left end 14 of the battery casing is provided at its bottom portion with an inlet port 18 and its top portion with an outlet port 20. A series of plates 22 are mounted within the battery casing 12 and are spaced from the bottom and top of the battery casing to form inlet and outlet manifolds 24 and 26 which communicate with the inlet and outlet ports 18 and 20 respectively. As shown in FIG. 7 the battery casing 12 may be a hollow cylinder and the battery plates 22 may be substantially octagonal in order to form the inlet and outlet monifolds 24 and 26. Longitudinal resilient strips 28 may be provided for sealing opposite sides of the plate 22 along the interior of the battery casing 12. The plates 22 may be spaced by small spacing beads (not shown) and positive and negative bus rods may be provided at 30 and 32 respectively. The details of the construction of this battery are fully described in the U.S. Patent 3,472,699 to Donald N. Jackley et al.

As shown in FIG. 1, the prior art recirculation system includes a conduit 34 which communicates the outlet port 20 of the battery casing with the inlet port 18 thereof. Interposed in the conduit 34 is a pump 36 for recirculating old electrolyte exiting the battery through the outlet port 20. This pump is driven by a motor (not shown) which may be powered by the battery 10 or some external source. Intermediate the outlet port 20 and the pump 36 the conduit 34 is provided with an exhaust line 38, and intermediate the pump 36 and the inlet port 18 the conduit 34 is provided with an inlet line 40 for receiving a new flow of electrolyte. Interposed in the inlet line 40 is an electrically adjustable valve 42 for opening and closing the new flow line 40 in response to output voltage from the battery 10. The valve 42 is opened and closed by a voltage from a voltage control sensor 44 which senses the output voltage from an output lead 46 from the battery.

When the output voltage from the battery 10 falls below a desired level, such as 240 volts, the voltage control sensor 44 sensors this drop and feeds a voltage to the valve 42 to close this valve and restrict the flow of new electrolyte into the battery. This causes the pump 36 to circulate through the battery a higher ratio of old electrolyte flow to the new cooler flow, thus raising the temperature of the electrolyte in the battery. This causes the battery voltage to go up. If the battery voltage exceeds the selected level the voltage control sensor 44 senses this condition and opens the valve 42 so that the new cooler electrolyte is mixed with the old electrolyte so as to cool the electrolyte being circulated through the battery. This then lowers the output voltage of the battery.

As shown in FIG. 2, the ratio of recirculated flow to new flow of the electrolyte within the battery of FIG. 1 will change significantly over the life of the battery. The ratio of recirculated flow to new flow shown during a major portion of the life of this battery is low and not desirable since it causes a high temperature differential of the electrolyte between the bottom and top of the battery plates 22. This high temperature differential causes the top portions of the plates 22 to be used quicker than the bottom portions thereof. Other disadvantages of the recirculation system for the battery of FIG. 1 are that the motor (not shown) to drive the pump 36 will impose a considerable energy drain on either the battery 10 or some other source; the size and weight of the pump 36 and motor are undesirable for underwater vehicles, especially torpedoes; and a high pressure rotating seal is required between the pump 36 and the motor which becomes a problem at deep ocean depths. All of these disadvantages are overcome by our invention which is fully described below.

Figure 8:
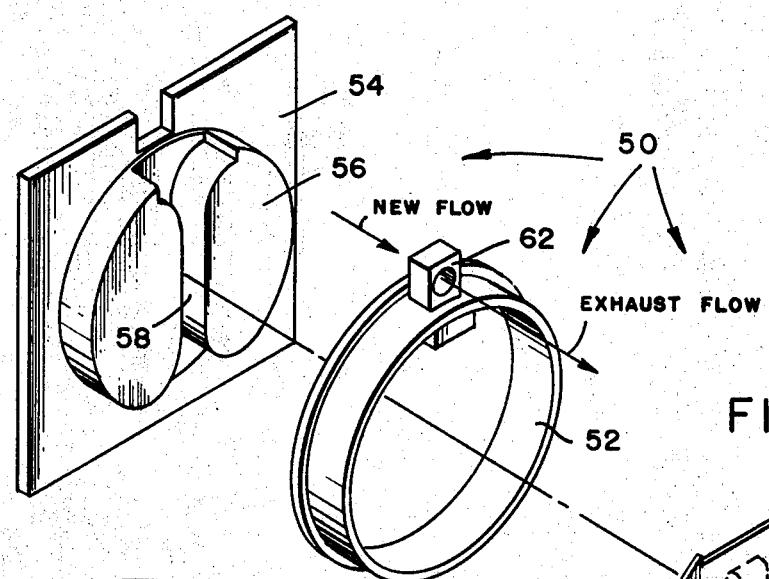
FIG. 8 is an exploded view of the recirculation system of our battery illustrated in FIG. 3.

One embodiment of our invention is the battery 48 shown in FIG. 3, which may be similar to the battery 10 of FIG. 1 in regard to the battery casing 12, ends 14 and 16, plates 22, inlet and outlet manifolds 24 and 26, and inlet and outlet ports 18 and 20. Our recirculation system for the battery 48 includes a passageway means 50 which is mounted at the end 14 of the battery so as to communicate the outlet and inlet ports 20 and 18 with one another. As shown in FIG. 8, the passageway means 50 may include a ring 52 and end plate 54 which are mounted to the battery end 14 by any suitable means such as bolts (see FIG. 3). The end plate 54 is provided with a large boss 56 which is snugly received within the ring 52 and has a vertical passageway 58 which is enlarged as its ends to communicate the outlet port 20 (see FIG. 3) with the inlet port 18 in the battery end. The battery end 14 may be provided with a raised portion 60 which is received within and partially restricts the middle portion of the passageway 58 so as to provide a venturi action. A portion of the old flow is discharged from the top portion of the passageway 58 as an exhaust flow from the battery.

Figure 9:
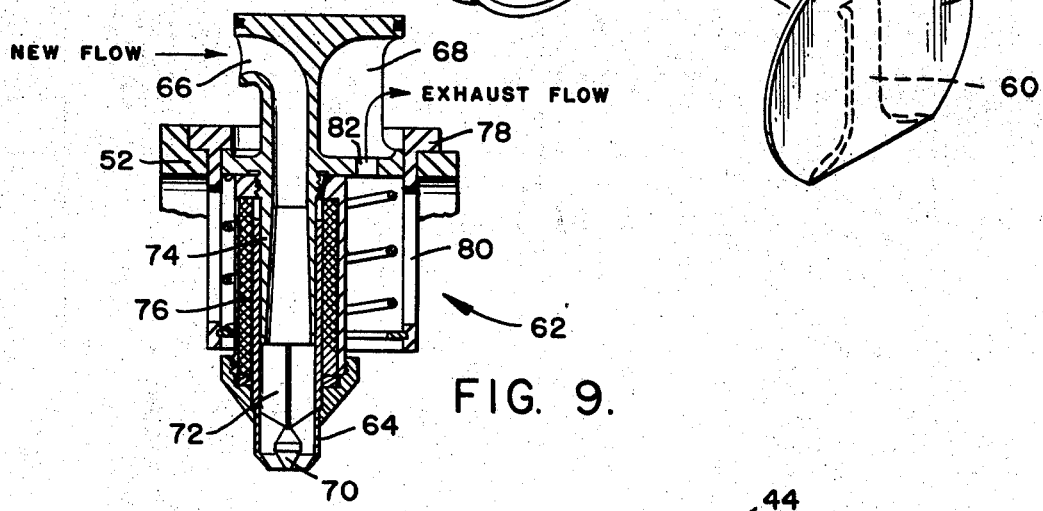
FIG. 9 illustrates a vertical cross-sectional view through an exemplary flow control valve.

Mounted within the top portion of the passageway 58 there may be located a solenoid operated "bang-bang" flow control valve 62. As shown in FIG. 8, this valve may be mounted through the top of the ring 52. As shown in FIG. 9, the flow control valve 62 includes a jet nozzle 64 which has an inlet port 66 which is adapted to receive new electrolyte flow from the ocean. The end of the jet nozzle 64 is mounted within the passageway 58 so as to cause venturi action between the new electrolyte flow and a portion of the old electrolyte battery flow from the outlet port 20. The control valve 62 may be further provided with an exhaust port 68 and an electrically operated valve means for controlling the new electrolyte flow to the jet nozzle 64. The electrically operated valve means may include the following: a pintle 70, a spider 72 which fixedly connects the pintle 70 to a valve body 74 so that the nozzle 64 may longitudinally slide with respect to the pintle 70, and a solenoid coil 76 slidably surrounding the nozzle 64. Accordingly, when the coil 76 is deenergized, the pintle 70 will open the nozzle 64, as shown in FIG. 9, due to the pressure of the new electrolyte flow on the nozzle, and when the coil 76 is energized the nozzle 64 is actuated upwardly to engage the pintle 70 so as to close the nozzle. It should be understood that the flow control valve, shown in FIG. 9, is exemplary and another workable arrangement would be simply to mount a jet nozzle within the passageway 58 and provide an electrically operated valve means at some location within the new electrolyte flow line to the nozzle. The flow control valve 62 may be further provided with a mounting tube 78 which has ports 80 for receiving the exhaust electrolyte flow from the passageway 58. The valve body 74 may have a port 82 for communicating this flow to the port 68.

Figure 10:
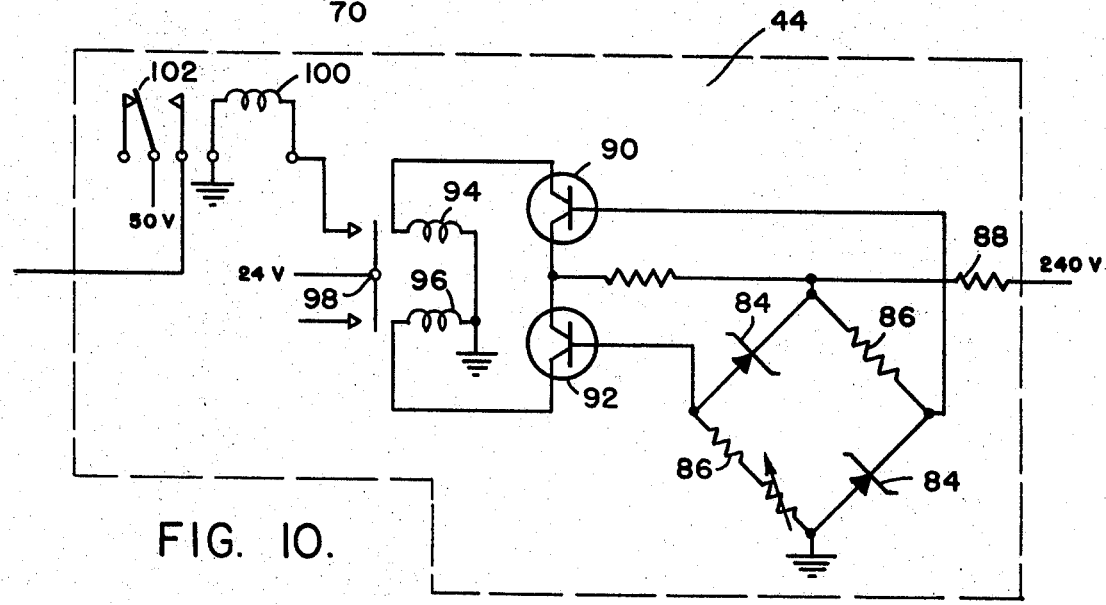
FIG. 10 illustrates an exemplary circuit which can be utilized for a voltage control sensor.

The voltage control sensor 44 provides a means which is connected between the output lead 46 of the battery and the valve means of the flow control valve 62 for closing the valve means when the battery voltage falls below a predetermined level, such as 240 volts. An exemplary circuit for the voltage control sensor 44 is shown in FIG. 10. This circuit includes a balanced bridge which includes Zener diodes 84 in one pair of legs and resistors 86 in the other pair of legs. The battery output voltage, after reduction by a resistor 88, is connected to one junction point of the bridge as well as to emitters of a pair of PNP transistors 90 and 92. The opposite junction point of the balanced bridge may be grounded. The remaining opposite junction points of the balanced bridge may be connected respectively to the bases of the transistors 90 and 92 and the collectors of the transistors are connected respectively to a pair of solenoid coils 94 and 96. The solenoid coils 94 and 96 operate a switch 98 which in turn is capable of applying a voltage to another solenoid coil 100. The latter solenoid coil operates a switch 102 which is capable of applying a voltage for actuating the solenoid 76 of the flow control valve 62. When the voltage applied to the balanced bridge falls below a desired level the bridge is imbalanced and current is sent to the transistors 90 and 92. This will cause the transistor 90 to shut off and the transistor 92 to be actuated so as to apply the voltage on switch 98 to the solenoid 100. The solenoid 100 in turn actuates the switch 102 to apply the operating voltage required to actuate the solenoid 76 of the flow control valve 62. This closes the flow control. When the voltage applied to the balanced bridge exceeds the desired level the transistor 90 is actuated and the transistor 92 is shut off. The switch 98 then opens and breaks the circuit to solenoid 100 so as to stop current flow to the solenoid 76 of the flow control valve 62. This then causes the flow control valve to open and provide new electrolyte to the battery.

As stated hereinabove the flow control valve 62 may have an inlet port 66 which is adapted to receive new electrolyte flow. As shown schematically in FIG. 3, we have found it desirable to connect the inlet port of the flow control valve 62 to a sea water scoop 104 of the underwater vehicle. Accordingly, when the underwater vehicle, such as a torpedo, is launched into the water the sea water scoop 104 will scoop sea water and introduce this electrolyte as new flow to the battery under ram pressure through the nozzle of the flow control valve 62. When new electrolyte is discharged through the nozzle 64 of the flow control valve 62, the discharge from the nozzle causes a venturi action with the old electrolyte flow in the upper portion of the passageway 58 so as to introduce a mixture of new and old electrolyte flows into the battery through the inlet port 18. A portion of the old electrolye flow will be discharged through the exhaust port 68 of the flow control valve 62.

As shown in FIG. 4, our battery 48 provides a more desirable ratio of recirculated flow to new flow than that illustrated in FIG. 2 for the prior art recirculation system. As shown in FIG. 4 the ratio of recirculated flow to new flow is somewhat greater than one throughout the entire run time of the battery so that the temperature differential between the bottom and top of the battery plates 22 is kept at a minimum. Accordingly, the use of the plates 22 of the battery 48 will be significantly more even than the use of the plates 22 of the battery 10.

Figure 5:
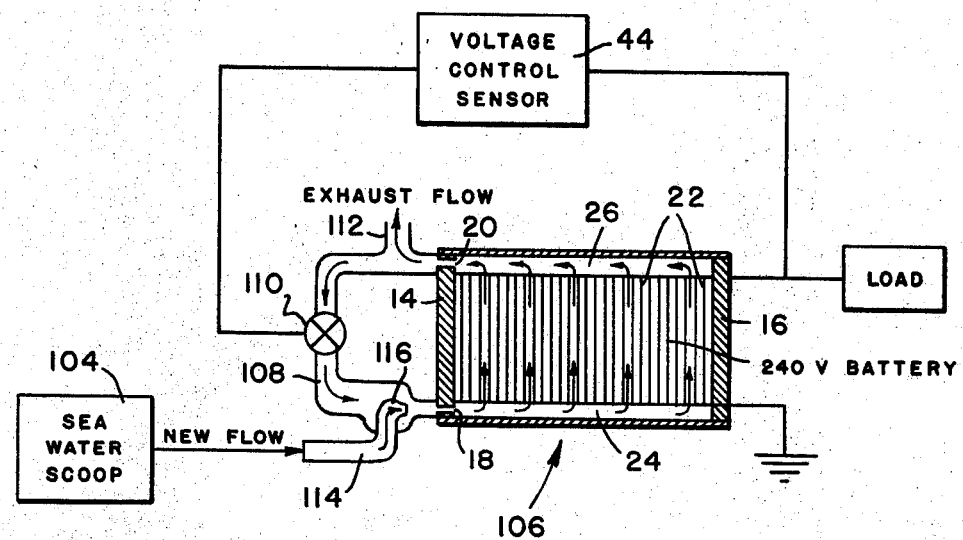
FIG. 5 illustrates a sea water battery with another embodiment of our recirculation system with most of the details shown schematically.

Another embodiment of the invention is illustrated somewhat schematically in FIG. 5. This battery 106 is, with exception of the recirculation portion, substantially identical to the battery 48 shown in FIG. 3. The recirculation system of the battery 106 includes a conduit 108 which communicates the outlet port 20 with the inlet port 18. Interconnected in the conduit 108 is an electrically operated valve 110, and between this valve and the outlet port 20 there is located an exhaust line 112. Intermediate the valve 110 and the inlet port 18 there is a new electrolyte flow line 114 which extends into the conduit 108 and terminates in a nozzle 116 which is oriented in the direction of the conduit 108 toward the inlet port 18. The new flow line 114 in turn may be connected to the sea water scoop 104. The electrically operated valve 110 is operated by the voltage control sensor 44, as described hereinabove. When the underwater vehicle is underway the sea water scoop 104 scoops new electrolyte and introduces this under ram pressure via the line 114 into the conduit 108. Venturi action takes place within the conduit 108 between the new electrolyte with a portion of the old electrolyte which is passed by the valve 110. When the battery voltage drops the voltage control sensor 44 opens the valve 110 to recirculate more of the old flow so as to raise the temperature of the electrolyte within the battery 106. This causes the battery voltage to increase. When the battery voltage exceeds the desired level, the voltage control sensor 44 closes the valve 110 so that more of the new and cooler electrolyte from the sea water scoop 104 enters the battery. This cooler electrolyte lowers the voltage and brings it back to the desired level.

Figure 6:
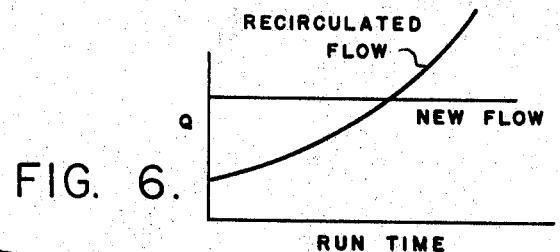
FIG. 6 is a graph illustrating quantities of new electrolyte flow and recirculated or old electrolyte flow versus run time for our embodiment illustrated in FIG. 5.

As shown in FIG. 6, the ratio of recirculated flow to new flow of the electrolyte during the run time of the battery 106 is not as desirable as that reflected in the graph for the previous embodiment (see FIG. 4). However, during the last two-thirds run time of the battery this ratio is more desirable than the ratio reflected in FIG. 2 for the prior art recirculation system. Our embodiment in FIG. 5 has eliminated the need of the pump and the motor which is required by the prior art recirculation system (see FIG. 1).

Obviously many modifications and variations of the present invention are possible in the light of the above teachings. It is therefore to be understood that within the scope of the appended claims the invention may be practiced otherwise than as specifically described.

We claim:
1. A sea water battery comprising:
   a battery casing having a pair of spaced apart ends, a bottom portion of one end having an inlet port and a top portion of the same end having an outlet port;
   a series of plates mounted within said casing and spaced from the bottom and top thereof to form inlet and outlet manifolds which communicate with said inlet and outlet ports respectively;
   passageway means mounted at said one end of the battery casing for communicating said outlet and inlet ports;
   a jet nozzle having an inlet port for receiving new electrolyte flow from the ocean;
   said jet nozzle being mounted within said passageway for causing venturi action between the new flow and a portion of electrolyte battery outlet flow from said outlet port;
   an electrically operated valve means for controlling new electrolyte flow to said jet nozzle; and
   means connected between an output lead of the battery and said valve means for closing said valve means when the battery voltage falls below a predetermined level.

2. A sea water battery as claimed in claim 1 including:
   a sea water scoop connected to the inlet port of the jet nozzle to provide new electrolyte flow thereto.

3. A sea water battery as claimed in claim 1 wherein:
   the jet nozzle is mounted in a bottom portion of said passageway means; and
   said valve means is mounted in the passageway means between the jet nozzle and said outlet port.

4. A sea water battery as claimed in claim 3 including:
   a sea water scoop connected to the inlet port of the jet nozzle.

5. A sea water battery as claimed in claim 1 wherein:
   the nozzle is mounted in a top portion of the passageway means adjacent said outlet port.

6. A sea water battery as claimed in claim 5 wherein:
   the passageway means has an exhaust port in a top portion thereof.

7. A sea water battery as claimed in claim 6 including:
a sea water scoop connected to the inlet port of the jet nozle.

References Cited

UNITED STATES PATENTS

| | | | |
|---|---|---|---|
| 2,781,413 | 2/1957 | Luening | 136—112 |
| 3,012,087 | 12/1961 | Van Billiard et al. | 136—160 |
| 3,154,040 | 10/1964 | Neubert | 114—20 |
| 3,388,003 | 6/1968 | Jackley | 136—100 |
| 3,463,671 | 8/1969 | Doll et al. | 136—160 |
| 3,470,032 | 9/1969 | Egan | 136—160 |
| 3,472,699 | 10/1969 | Jackley et al. | 136—100 |

WINSTON A. DOUGLAS, Primary Examiner
A. SKAPARS, Assistant Examiner

U.S. Cl. X.R.

136—160